W. T. HILDRUP.
Rotary Harrow.
No. 23,578.
Patented Apr. 12, 1859.
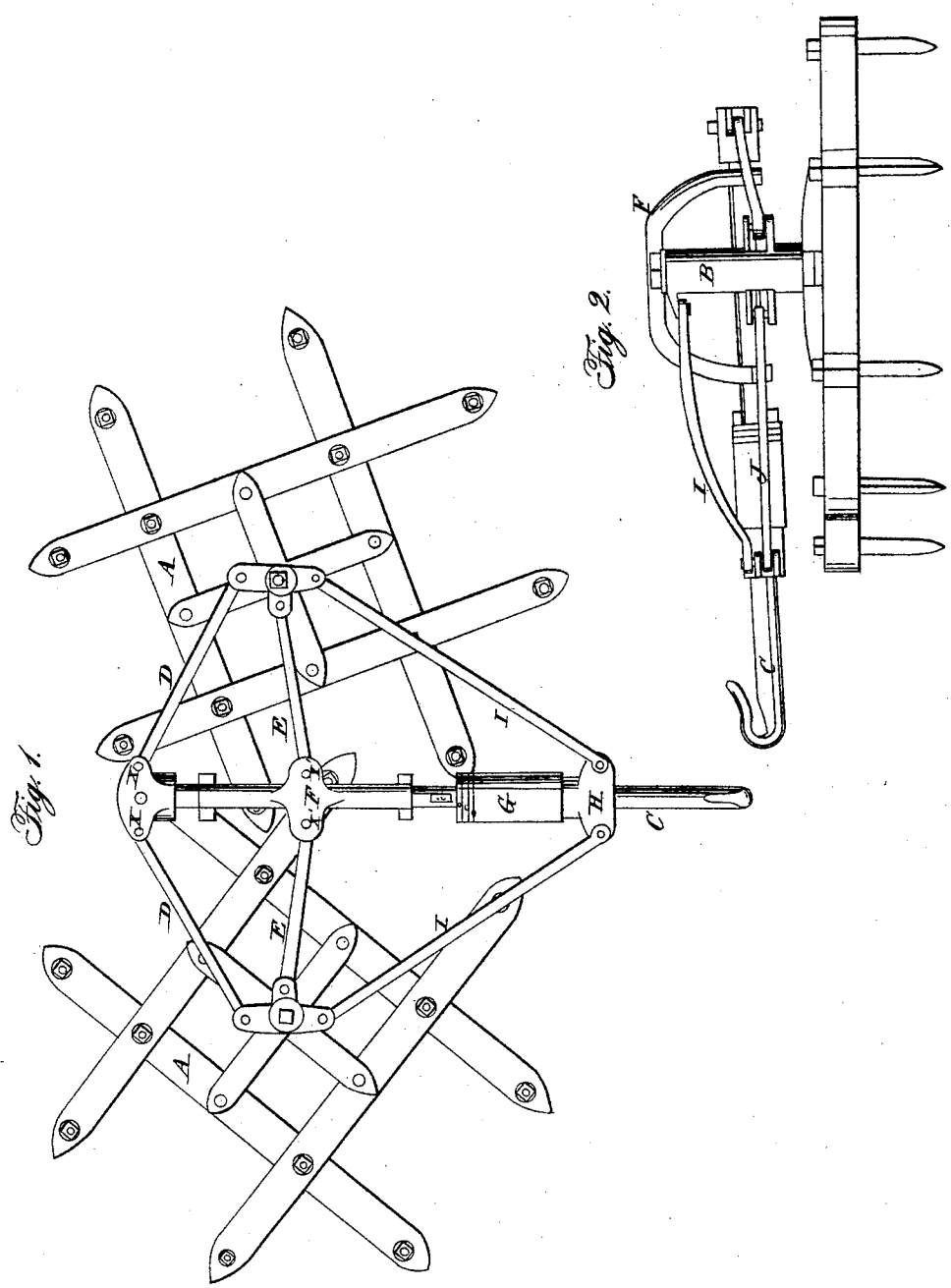
Witnesses:
C. M. Alexander
A. A. Leahman
Inventor:
W. T. Hildrup

UNITED STATES PATENT OFFICE.

W. T. HILDRUP, OF HARRISBURG, PENNSYLVANIA.

IMPROVEMENT IN ROTARY HARROWS.

Specification forming part of Letters Patent No. 23,578, dated April 12, 1859.

*To all whom it may concern:*

Be it known that I, W. T. HILDRUP, of Harrisburg, Pennsylvania, have invented certain new and useful Improvements in Rotary Harrows; and I do hereby declare that the following is a full, clear, and exact description of the same, reference being had to the accompanying drawings, and to the letters of reference marked thereon, in which—

Figure 1 is a plan view and Fig. 2 is a side elevation.

In the figures, A A represent two frames, which consist each of four pieces of wood, which are secured together as shown in the drawings. The ends of the pieces forming the frame project and interlap, so that they work together when they revolve as cog-gearing. The teeth of the harrows are secured on the under sides of these frames. From the centers of these frames arise standards, over which pass sleeves B B. The connection between the frames is made from the sleeves B B.

D D are bars, which are pivoted to ears on the lower extremities of the sleeves B B at one end and to ears on the end of the draft-bar at the other.

E E are bars, which are pivoted to ears near the top of the sleeves and to a piece, F, which slides freely upon the draft-bar C.

J J are draft-rods, connected also to the lower extremities of the sleeves at one end and to a collar, H, which slides on the forward end of the draft-bar C at the other.

I I are braces, which are secured to the tops of the sleeves at one end and to the collar A at the other.

*i* represents a key, which passes through a slot in the draft-bar C.

*o o o* are washers, and G is a cylindrical piece of india-rubber, which passes over the bar C. The key *i* and collars *o o o* press against the rear end of the rubber, and the collar H presses against its forward end when the harrows are in operation.

It will readily be seen that this is a flexible harrow, the frames being allowed to accommodate themselves to uneven ground, while at the same time they are allowed to approach each other and interlap more or less, as the case may require, for the purpose of mashing and breaking the clods.

The braces I I are for the purpose of preventing the harrows from pitching too far forward and for keeping them in proper position. When these harrows are set in motion the outer teeth are slightly elevated, while the inner teeth are depressed, and, running deeper into the ground, they revolve very readily.

Having thus fully described my improvement, what I claim as new, and desire to secure by Letters Patent, is—

The arrangement of the bars E E, sliding piece F, braces I I, and draft-bar C, substantially in the manner herein specified, for the purpose of giving two or more harrows a self-adjusting movement to or from each other, as is herein fully set forth.

W. T. HILDRUP.

Witnesses:
C. M. ALEXANDER,
A. A. YEATMAN.